United States Patent [19]
Patrusky et al.

[11] 3,868,481
[45] Feb. 25, 1975

[54] TRUNK FORMATTER

[75] Inventors: Bernard Eugene Patrusky, Dresher, Pa.; Alfred Mack, Camden, N.J.

[73] Assignee: RCA Corporation, New York, N.Y.

[22] Filed: Aug. 22, 1973

[21] Appl. No.: 390,616

[52] U.S. Cl. ....... 179/15 BV, 179/15 AF, 179/15 A
[51] Int. Cl. ............................................ H04j 3/04
[58] Field of Search ....... 179/15 AF, 15 BA, 15 BS, 179/15 BV, 15 A

[56] References Cited

UNITED STATES PATENTS

| | | | |
|---|---|---|---|
| 3,766,322 | 10/1973 | Moffett | 179/15 BV |
| 3,781,818 | 12/1973 | Pardoe | 179/15 BV |
| 3,809,820 | 5/1974 | Sulivan | 179/15 BV |

*Primary Examiner*—Ralph D. Blakeslee
*Attorney, Agent, or Firm*—Edward J. Norton; Joseph S. Tripoli

[57] ABSTRACT

A system for providing incoming digital signals from a trunk line to a time division switch. The incoming digital signals may be arranged in one of several channel groupings. The system arranges the incoming channel groupings into a standard channel grouping compatible with the time division switch. The system includes an elastic buffer with a sufficient delay so that despite timing differences between the incoming digital signals and the local switch timing, the digital information is bit, byte and frame aligned when provided at the switch.

11 Claims, 3 Drawing Figures

TRUNK FORMATTER

The invention herein described was made in the course of or under a contract or subcontract thereunder with the Department of the Air Force.

The present invention relates generally to digital communications systems and more particularly to a means for aligning bit, byte and channel data received from various sources which are not in synchronism with a local time division multiplexed switch.

There are many time division multiplexed switches, or modems, which accept digital signals in a particular format. That is, the switches operate at a specific data rate and process the incoming information using a specific channel grouping. A channel of information comprises a specific number of digital bits of information per second, for example, eight bits transmitted every 125 microseconds may comprise one 64Kbs channel. Twelve such channels may be multiplexed in time division on a per call basis to provide a digital time division highway with a bit rate of 768 Kbs, which is in turn applied to a time division circuit switch.

The digital information per se may represent data or digitized voice. In digitized voice communications, and especially in secure digitized voice communications, a problem arises when one attempts to multiplex information through a time division switch where the incoming digital signals are generated from sources whose channel groupings are different from that which is compatible with the switch and where the timing of those sources differs, even slightly, from that of the switch.

One solution to the timing problem is the use of a common clock for the source and the switch. The solution, however, is expensive and difficult to implement expecially where the source and the switch are physically at a great distance from each other.

To date, the easiest way of circumventing the channel grouping problem is to use sources which are compatible with the switches with respect to channel groupings.

In addition, when Pulse Code Modulation (PCM) is the technique utilized for digitizing speech, the number of bits per byte utilized to represent the amplitude of the speech sample and the associated signaling may either be 8 bits or 6 bits. Eight bit coding is utilized for common carrier and military fixed plant applications, and 6 bits is utilized for tactical military applications. Thus, a trunk formatter which can accommodate both 6 bit and 8 bit PCM or data bytes is advantageous in the sense of equipment reduction. The present invention solves the timing byte and channel grouping problems in a way which is practical from an implementation standpoint and affords flexibility with respect to the types of sources which may be used with a particular switch.

In accordance with the present invention, there is provided a system for delivering incoming digital signals to a time division multiplex switch from a trunk time division highway having the incoming digital signals at any one of a plurality of channel groups and bit rates. The system comprises a digital signal processing means connected between the time division trunk highway and the switch. The digital signal processing means arranges any one of the several incoming time division multiplexed channel groups into a standard channel grouping compatible with the time division switch. The digital signal processing means also comprises a digital storage means where the incoming digital signals are read into the storage means at times derived from the incoming digital signals and read out of the storage means at times derived from timing which is associated with the switch. The time division multiplex switch is thereby provided with digital signals at a standard time division channel grouping and at a standard bit rate.

In another aspect of the present invention, means are provided for operating on the digital signals read out of the storage means for adjusting the byte structure of the signals being read out to a standard byte structure compatible with the switch.

IN THE DRAWING

Figure 1:
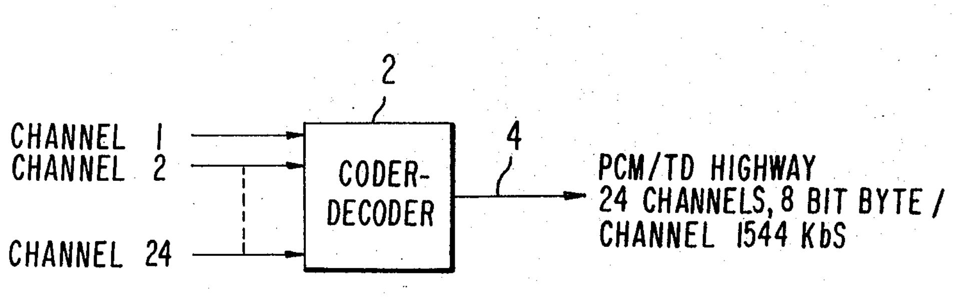
FIG. 1 is a block diagram showing the manner in which a time division highway is generated.

Referring now to FIG. 1, a plurality of incoming lines, each corresponding to a channel of information, is this case 24 channels, are connected to a coder-decoder unit 2. The 24 incoming channels may be, for example, analog voice signals. The coder-decoder unit 2 samples each of the incoming channels, pulse code modulates the samples and then multiplexes the samples to generate a pulse code modulated time division (PCM/TD) highway on line 4. Typically, the sampling rate is at a nominal 8,000 samples per channel per second. Thus, with 24 channels and an 8 bit byte and an 8,000 sample rate, the data rate on line 4 would be 24 × 8,000 × 8 or 1,536K bits/sec. If a framing bit in each sample is also used, the data rate on line 4 becomes 1,536 + 8,000 bits/sec. or 1,544K bits/sec.

Figure 2:
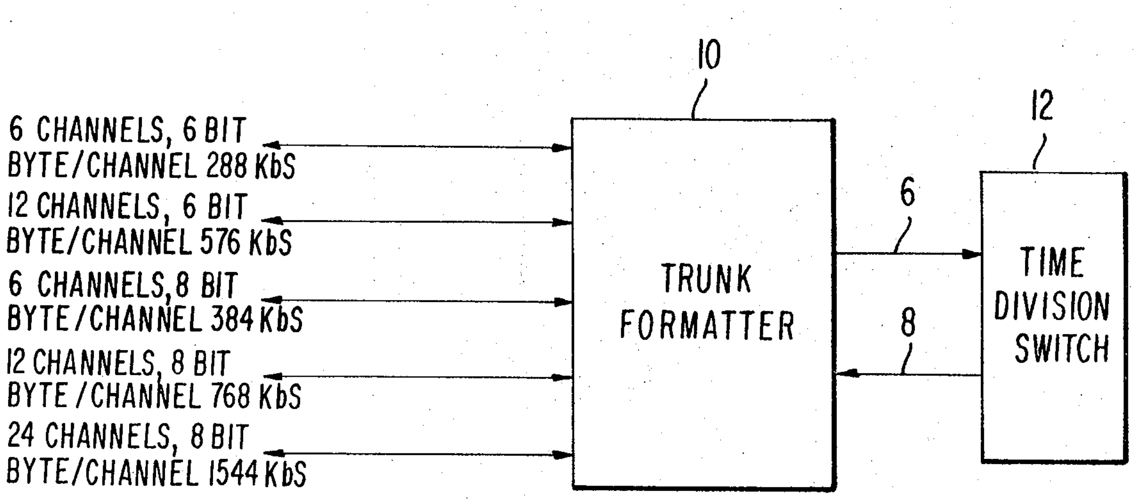
FIG. 2 is a block diagram showing the use of a trunk formatter in accordance with the present invention with a plurality of sources.

FIG. 2 shows a plurality of incoming PCM/TD highways connected to a trunk formatter 10. The incoming highways, it will be noted, comprise a plurality of channel groupings e.g., 6, 12 and 24 channels, a plurality of bits for comprising a btye e.g., 6 and 8, and a plurality of data rates e.g., 288, 576, 384, 768 and 1,544K bits/sec.

The function of the trunk formatter 10 is to process the signals on the incoming trunks or highways so as to provide the information to the time division switch 12 via line 6, which may be several conductors, at a standard channel grouping, standard byte structure and standard bit rate compatible with switch 12. Similarly, for information coming from switch 12 at the standard channel grouping, byte structure and bit rate via line 8, which may be several conductors, the formatter 10 processes these signals to the particular channel grouping, byte structure and bit rate of the particular PCM/TD highway to which the information is to be delivered. Each highway is returned to a coder-decoder, such as unit 2, where the information is separated out on individual lines in analog form.

Figure 3:
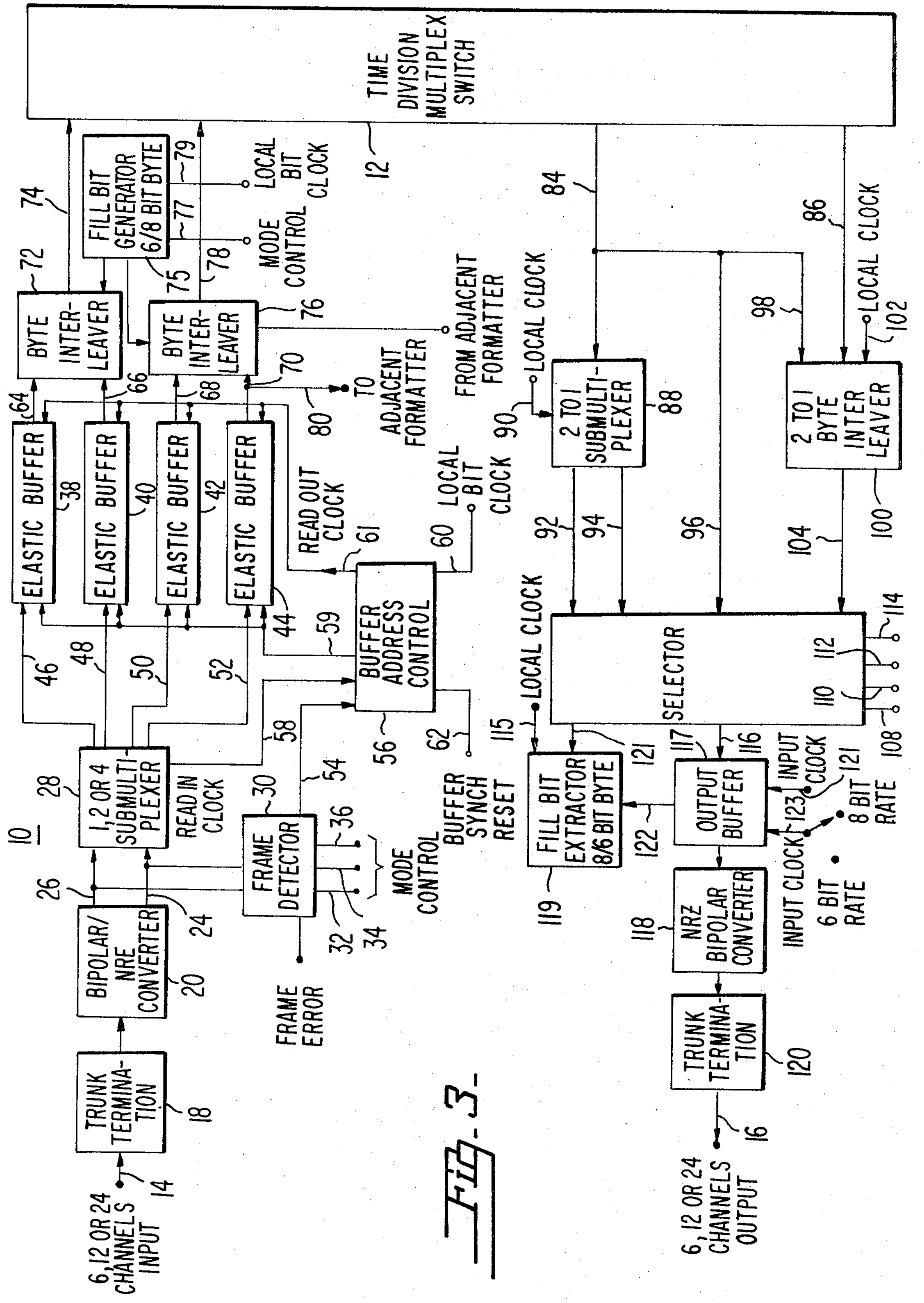
FIG. 3 is a block diagram of one embodiment of a trunk formatter in accordance with the present invention.

The embodiment of a trunk formatter in accordance with the present invention shown in FIG. 3 is in the context of a PCM system. However, the essential elements of the present invention may be employed in a Delta Modulation (DM) system or some hybrid system combining the principles of PCM and DM. The basic difference is that PCM channels are time multiplexed on a 6 bit, or 8 bit byte basis, while Delta Modulation channels are time multiplexed on a 1 bit basis.

In FIG. 3 a trunk formatter shown generally as 10 is interposed between a time division multiplex switch 12 and an incoming time division multiplexed (TDM) trunk highway 14 and an outgoing time division multiplexed (TDM) trunk highway 16. Incoming TDM trunk highway 14 carries digital signals representing data or digitized voice information. The source of the incoming digital signals (not shown) may typically provide the digital signals in groupings of channels. Each channel contains a certain number of bits, say for example, 8 bits per channel. The particular source may provide 6, 12 or 24 channels of information in a frame.

The incoming digital signals are provided at an incoming TDM trunk highway termination 18. Termination 18 amplifies and shapes the incoming signals in preparation for further processing.

After the digital signals are amplified and shaped in TDM trunk highway termination 18, the signals are delivered to a Bipolar to NRZ (non-return to zero) converter 20. Converter 20 extracts timing from the incoming data stream and converts the data from Bipolar to NRZ signals. The extracted timing is applied to line 26 for shifting the input NRZ signals on line 24 into submultiplexer 28. The data and clock signals on lines 24 and 26 respectively, are also applied to a frame detector 30.

The frame detector 30 searches for and detects the incoming frame pattern on trunk highway 14. Frame detector 30 is equipped to receive mode control signals from a source (not shown) on lines 32, 34, and 36. The mode control signals indicate to the frame detector 30 that 6, 12, or 24 channels of data are coming into the formatter 10. The mode control signals also determine the partitioning algorithm in the submultiplexer 28 such that an incoming 24 channel group is partitioned into four 6-channel groups and an incoming 12 channel group is partitioned into two 6-channel groups. A 6-channel group coming into the formatter 10 is not partitioned.

The six channel groupings from submultiplexer 28 are delivered to elastic buffer units 38, 40, 42 and 44 via lines 46, 48, 50 and 52 respectively. The Read In timing derived from the input TDM highway is supplied via line 58 to the buffer address control 56. Each 6-channel subgroup is read into two buffer stores which comprise the elastic buffer units 38, 40, 42 and 44. Thus, since each PCM channel occupies 8 data bit locations, each of the elastic buffer units 38, 40, 42 and 44 can accommodate 6×8×2, or 96 bits. The data read into the elastic buffer units is dependent upon the location of a frame synch pulse generated on line 54 from frame detector 30 and delivered to the buffer address control 56.

Buffer address control 56 directs the data bits on lines 46, 48, 50, and 52 into the appropriate storage locations in elastic buffer units 38, 40, 42 and 44 via signals from line 58 and read in timing on line 59. In addition, data is read out from elastic buffer units 38, 40, 42 and 44 on timing line 61 derived from the local switch timing provided on line 60 to buffer address control 56. Thus, the buffer address control is responsible for reading in data to the elastic buffer units 38, 40, 42 and 44 on timing derived from the incoming data stream and for reading out data from the memory at times derived from timing associated with the local switch 12 on line 61. The local switch timing to the buffer address control is provided on line 60.

In the elastic buffer units 38, 40, 42 and 44 an initial buffering delay is provided. That is, the data read out is delayed by, initially, a certain number of data bit time intervals. This feature is provided because the timing of the incoming data is not exactly synchronized to the local switch timing. If the difference in timing between the incoming data and the local switch is known, then the amount of delay or buffering can be selected so that the delay can be re-set periodically before the reading in of data overlaps the reading out of data from the elastic buffer units 38, 40, 42 and 44. Thus, in FIG. 3 a buffer synch reset control signal is provided to buffer address control 56 via line 62 once every 24 hours, an interval that is appropriate for independent Rubidium clocks. Each time a reset signal is put on line 62, the initial buffering delay is restored between data read in and data read out.

Data from the elastic buffer units 38, 40, 42 and 44 is read out on lines 64, 66, 68 and 70 respectively. The data on lines 64, 66, 68 and 70 is grouped into six channels on each of the aforementioned lines when the incoming signal was in a 24 channel grouping.

The six channels on lines 64 and 66 are time interleaved in byte interleaver 72 to form a 12-channel grouping which is supplied to switch 12 via line 74. Similarly the six channels on each of the lines 68 and 70 are interleaved in byte interleaver 76 to form a 12-channel grouping which is supplied to switch 12 via line 78. By interleaving on an 8 bit byte basis, the integrity of the PCM code for each channel is retained.

Twelve channel groupings are developed on lines 74 and 78 because the switch 12 is designed to accept 12 channels of data per incoming highway at a standardized bit rate and byte structure. The timing for the signals on lines 74 and 78 was derived from local switch timing, i.e., readout from the elastic buffer units 38, 40, 42 and 44, therefore, the data appearing on lines 74 and 78 are bit, byte and frame aligned for entry into the time division switch 12. The switch 12 itself may then perform further combining to make super highways from a plurality of lines such as 74 and 78.

In the event that the incoming digital signals on TDM trunk highway 14 are grouped into 6-channel frames, then there is no partitioning in unit 28 and the data is addressed and read into only one of the elastic buffer units, say unit 44. Provision is made, in this event, to transfer the 6-channel group on line 70 to the byte interleaver of an adjacent formatter over line 80. Likewise, a 6-channel group from an adjacent formatter is brought into byte interleaver 76 via line 82. Thus, even though originally a 6-channel grouping was provided on TDM trunk highway 14, a 12 channel standardized TDM highway is still provided on line 78 to switch 12.

In the event that the incoming signals on TDM trunk highway 14 are grouped into 12-channel frames, then there is a partition into two 6-channel groups in unit 28, and two of the elastic buffer units, say 38 and 40, are utilized for frame and bit alignment. The aligned 6-channel groups are then recombined, and a standardized 12-channel TDM highway is provided on line 74 to switch 12.

When the incoming signals on TDM trunk highway 14 are grouped into 24-channel frames, submultiplexer 28 divides the signals into four 6-channel groups and elastic buffer units 38, 40, 42 and 44 are utilized for frame and bit alignment and two 12-channel standardized TDM highways are provided, one on line 74 and the other on line 78.

When the incoming PCM time division highway utilized 6 bit instead of 8 bit bytes, conversion to the standardized 8 bit byte structure is accomplished by use of the fill bit generator 75. Fill bit generator 75 is activated by the mode control via line 77. Unit 75 adds two fill bits to each of the 6 bit bytes in byte interleavers 72 and 76. Since fill bit generator 75 is driven by the same local bit clock, on line 79, as is used for read out clock for the elastic buffers, the standardized output highway bit rates and byte structure will be provided on lines 74 and 78.

Information transfer from calling party channels on the incoming highways to called party channels on the outgoing highways is accomplished in the time division switch 12. Outgoing 12-channel standardized highways appear on lines 84 and 86. The outgoing highway on line 84 is partitioned into two 6-channel highways by submultiplexer 88 with local switch timing being provided on line 90. The two 6-channel highways are provided on lines 92 and 94, while the 12-channel signals on line 84 are also applied to lines 96 and 98.

The two 12-channel standardized highways on lines 98 and 86 are connected to byte interleaver 100, with local timing being provided on line 102. The output highway from byte interleaver 100 has 24 channels of information and is provided on line 104.

The 6, 12, and 24 channel highway appearances of lines 92, 94, 96, and 104 are connected to a selector unit 106 with mode control signals being applied thereto over lines 108, 110, 112 and 114. With the appropriate control signal applied on one of the mode control lines 108, 110, 112 or 114, the selector 106 selects a 6, 12 or 24 channel highway to be provided at the output line 116, which connects to output buffer 117. If the output time division highway is to have 8 bit bytes, read in and read out from the buffer is at the same bit clock rate.

If the output time division highway is to have a 6 bit byte structure, the two fill bits per standardized 8 bit byte will be extracted by fill bit extractor 119. Fill bit extractor 119 is enabled by selector switch 106 and extracts the two fill bits per byte from buffer 117. Read in to buffer 117 is at the 8 bit clock rate, and read out is at the 6 bit clock rate.

The signals on line 116 may then be converted from NRZ to bipolar in converter unit 118. The converted signals from unit 118 are then amplified and shaped in line driver unit 120 and finally provided as the outgoing TDM trunk highway on line 16.

Thus, the described formatter has the ability to take any one of plurality of channel groupings from an incoming trunk and then rearrange the particular channel grouping into a standard grouping compatible with the particular switch. The standard grouping, in addition, is timed with respect to the switch so as to be compatible therewith. The standard channel grouping coming from the switch is processed in such a way that a selected one of the plurality of channel groupings is then provided to an outgoing trunk.

What is claimed is:

1. A system for providing incoming digital signals to a time division multiplex switch from a trunk time division highway having said incoming digital signals in any one of a plurality of channel groupings and bit rates, said system comprising:

digital signal processing means connected between said trunk time division highway and said switch for grouping any one of said plurality of time division multiplexed channel groupings into a standard grouping compatible with said time division switch; and wherein said digital signal processing means further comprises a digital storage means wherein said incoming digital signals are read into said storage means at times derived from the incoming digital signals and read out of said storage means at times derived from timing associated with said switch, said digital storage means comprising a plurality of elastic buffer delay units providing an initial predetermined buffer delay between read-in and read-out of said digital signals through said elastic buffer units and means for selectively resetting said initial predetermined buffer delay;

whereby said switch is provided with digital signals at said standard time division channel groupings and at a standard bit rate.

2. The system according to claim 1 further comprising re-grouping means connected between said switch and another time division trunk highway for selectively converting said standard channel groupings from said switch to any one of said plurality of channel groupings and for providing the selected one of said plurality of channel groupings to said other time division trunk highway.

3. The system according to claim 1 further comprising means operating on said digital signals being read out of said storage means for adjusting the byte structure of said read out signals to a standard byte structure compatible with said switch.

4. A system for providing incoming digital signals to a time division multiplex switch from a time division trunk highway having said incoming digital signals in any one of a plurality of channel groupings and a plurality of bit rates, said system comprising:

a trunk termination means for shaping and amplifying said incoming digital signals;

a converter in circuit with said trunk termination means for converting said incoming digital signals from bipolar form to NRZ form and for extracting bit timing therefrom;

a submultiplexer means for arranging any one of said plurality of channel groupings into at least one intermediate channel grouping;

digital signal storage means for storing said at least one intermediate channel grouping of incoming digital signals, said at least one intermediate channel grouping of incoming digital signals being read into said storage means at times derived from timing associated with said incoming digital signals, the digital signals in said at least one intermediate channel grouping being read out of said storage means at times derived from timing associated with said switch, said storage means also providing a predetermined initial buffering delay between read in and read out of the digital signals in said at least one intermediate channel grouping; and means for combining at least two sets of digital signals being read out of said storage means and for providing the combined set of signals at a standard channel grouping and a standard bit rate to said switch.

5. The system according to claim 4 wherein said storage means comprises a plurality of elastic buffer units and wherein means are provided for re-setting said predetermined initial buffering delay.

6. The system according to claim 4 further comprising re-grouping means connected between said switch and another time division trunk highway for selectively converting said standard channel grouping from said switch to any one of said plurality of channel groupings and for providing the selected one of said plurality of channel groupings to said other trunk.

7. The system according to claim 4 wherein said intermediate channel grouping corresponds in number to the smallest grouping in said plurality of groupings and wherein said standard grouping corresponds in number to another one of said plurality of channel groupings.

8. The system according to claim 4 further comprising means coupled to said combining means for operating on said signals being read out of said storage means for adjusting the byte structure of said read out signals to a standard byte structure compatible with said switch.

9. A system for providing incoming digital signals to a time division multiplex switch from a time division trunk highway having said incoming digital signals in any one of a plurality of channel groupings and a plurality of bit rates, said system comprising:

a time division trunk highway termination means for shaping and amplifying said incoming digital signals provided on said time division trunk highway;

means coupled to said time division trunk highway termination means for arranging any one of said plurality of channel groupings into at least one intermediate channel grouping;

storage means for storing the digital signals in said at least one intermediate channel grouping;

storage control means coupled to said storage means for reading in the digital signals in said at least one intermediate channel grouping to said storage means at times derived from timing associated with said incoming digital signals and for reading out said digital signals in said at least one intermediate channel grouping from said storage means at times derived from timing associated with said switch;

said storage means and said storage control means cooperating to provide an initial buffer delay between read in and read out of digital signals through said storage means;

means coupled to said storage means for interleaving digital signals read out from said storage means and for providing said read out digital signals in a standard channel grouping and a standard bit rate to said switch;

fill bit generator means coupled to said interleaving means for adjusting the byte structure of read out digital signals to a standard byte structure compatible with said switch;

first means coupled to said switch for accepting digital signals in said standard channel grouping and standard bit rate and for submultiplexing said standard channel grouping into first and second channel groupings;

second means coupled to said switch for accepting digital signals in said standard channel groupings and for combining two standard channel groupings into a third channel grouping;

third means coupled to said switch for accepting digital signals in said standard channel grouping;

means for selecting said first, second, third or standard channel groupings from said first, second, and third means;

a second time division trunk highway termination means for amplifying and shaping the digital signals in said selected channel grouping and for providing said amplified and shaped digital signals to an outgoing time division trunk highway; and fill bit extractor means coupled to said selecting means for adjusting the byte structure of the digital signals in the selected one of said first, second or third channel grouping to a byte structure compatible with said outgoing time division trunk highway.

10. The system according to claim 9 wherein said storage means comprises a number of elastic buffer units.

11. The system according to claim 10 wherein said storage control means further comprises means for selectively re-setting said initial buffer delay.

* * * * *